United States Patent [19]

Draebel

[11] Patent Number: 5,061,225
[45] Date of Patent: Oct. 29, 1991

[54] CHAIN WHEEL FOR CHAIN CONVEYOR BELTS

[75] Inventor: Jorgen Draebel, Hellerup, Denmark

[73] Assignee: SKF Specialty Products AB, Göteborg, Sweden

[21] Appl. No.: 278,597

[22] Filed: Dec. 1, 1988
(Under 37 CFR 1.47)

[30] Foreign Application Priority Data

Sep. 12, 1987 [SE] Sweden ............................. 8704918

[51] Int. Cl.[5] .............................................. F16H 55/30
[52] U.S. Cl. ....................................................... 474/95
[58] Field of Search ..................................... 474/95–99, 474/902, 903

[56] References Cited

U.S. PATENT DOCUMENTS 2,466,068 4/1949 Archer .................................. 474/95
3,501,972 3/1970 Morrow et al. ...................... 474/95

Primary Examiner—Thuy M. Bui
Attorney, Agent, or Firm—Eugene E. Renz, Jr.

[57] ABSTRACT

A chain wheel for conveyor installations with chain conveyor belts, and which chain wheel is mounted on the drive shaft (5) of the driving device for the conveyor belt. The chain wheel is designed in such a manner that it can be easily repaired and altered as to number of teeth, design of hub and number of tooth rims. It incorporates as a basic unit a pair of hub portions (1, 2) detachably connected against each other, between which, as a separate unit is clamped a tooth rim (3) comprising at least two sections 3a, 3b).

6 Claims, 1 Drawing Sheet

CHAIN WHEEL FOR CHAIN CONVEYOR BELTS

FIELD OF THE INVENTION

The present invention refers to a chain wheel for conveyor installations with chain conveyor belts, and which chain wheel is mounted on the drive shaft of the driving device for the conveyor belt.

BACKGROUND OF THE INVENTION

In conveyor installations are used moulded or milled chain wheels as power transfer means between driving motor and chain. Such chain wheels are simple and functional but it occurs that hub or tooth rim are damages under operation, which means that the chain wheel has to be replaced. This is often difficult and commonly means substantial shutdowns.

SUMMARY OF THE INVENTION

The purpose of the present invention is to provide a chain wheel of the type mentioned above, which is designed in such a manner that it may be altered in simple manner as to number of teeth, design of hub and number of tooth rims. It furthermore shall be easy to repair, whereby shutdowns in connection with repairs can be reduced. This has been solved in accordance with the invention therein that it as a basic until incorporates a pair of hub portions detachably connected against each other, between which, as a separate unit, is clamped a tooth rim comprising at least two sections.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
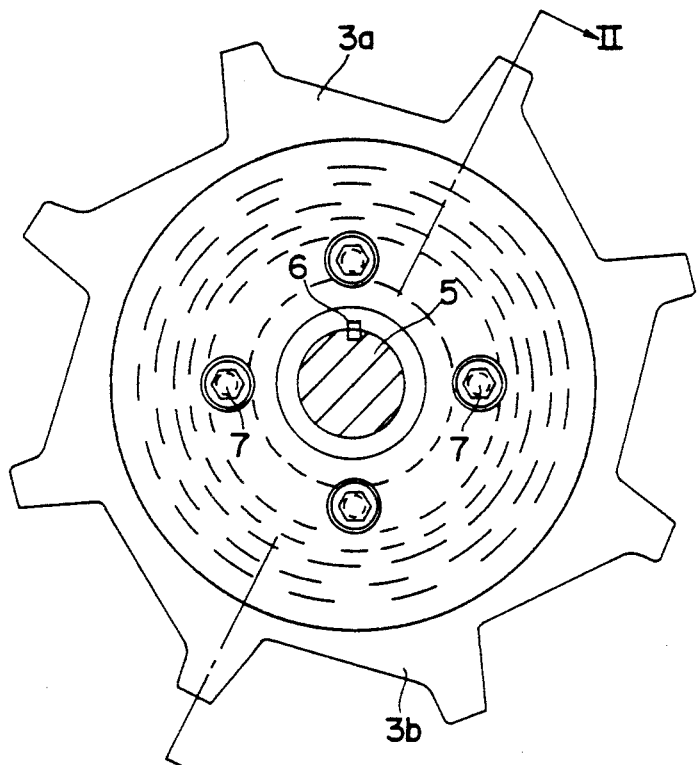
FIG. 1 is a front view of a chain wheel according to the invention.
Figure 3:
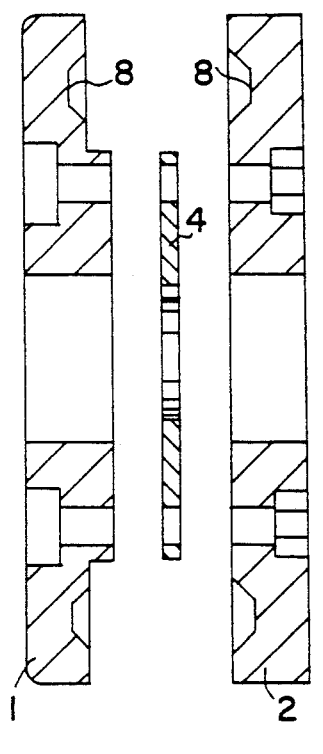
FIG. 3 shows in bigger scale an exploded view of some of the components forming part of the chain wheel according to FIG. 2.
Figure 2:
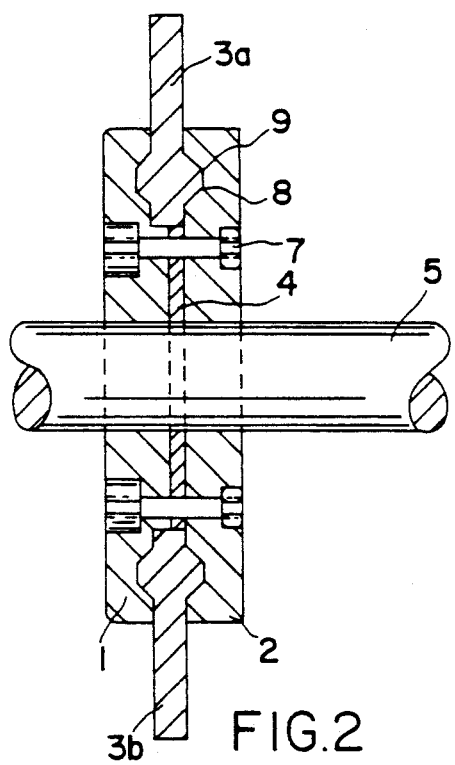
FIG. 2 is a section along line II—II in FIG. 1.

The chain wheel according to the invention is built from standard parts, which may be combined in several manners in order to provide different types of chain wheels. A standard wheel having one tooth rim is constructed from two hub portions, an outer and an inner hub portion 1 and 2, a tooth rim 3 split into two sections 3a and 3b and a reinforcing disc 4. The hub portions and the tooth rim may be of plastic material, e.g. nylon, whereas the reinforcing disc is made of steel. The reinforcing disc 4 is mounted on the drive shaft 5 and is in engagement with this via a key groove 6. The hub portions 1 and 2, the tooth rim 3a and 3b and the reinforcing disc 4 are clamped against each other by means of bolts 7.

The tooth rim sections 3a and 3b are arrested in accurate position by means of trapezoidal profiles 8, 9 formed in the hub portions 1 and 2 and in the tooth sections 3a and 3b, respectively. The trapezoidal profiles 8 serve, beside as guides, also as friction surfaces between hub and tooth rim, as this is not fixedly connected to the drive shaft 5 but has the driving power thereof transferred via the reinforcing disc 4 and the hub portions 1 and 2. These thereby shall be clamped together with such big force that the friction resistance between the hub portions 1 and 2 and the tooth rim 3 exceeds the torsional resistance from the drive shaft 5.

By varying the clamping force it is thereby possible to settle a maximum torsional moment that may be transferred to the tooth rim 3 and the system thereby functions as a safety coupling against overload of the conveyor chain.

Exchange of the tooth rim, which can either be necessitated by it being damaged or by a desire to alter the umber of teeth, is effect by untightening the bolts 7 and moving apart the hub portions 1 and 2, whereupon the tooth rim sections 3a and 3b can be removed from the hub and be replaced for new ones. If it is necessary only to exchange one of the tooth rim sections this is of course also possible. The bolts 7 is thereupon clamped with a force corresponding to the frictional resistance which is desired to obtain. Exchange of tooth rim thus can be effected without the hub having to be dismounted from the drive shaft 5, which means a substantial time saving and lower costs for spare parts.

The chain wheel can be easily enlarged with more tooth rims, e.g. at an increased load on the conveyor chain. A double chain wheel thus is built from two outer hub portions i, two inner hub portions 2 and two tooth rims 3. A treble chain wheel in the corresponding manner is built from two outer hub portions 1, four inner hub portions 2 and three tooth rims 3.

The chain wheel according to the invention is primarily intended for conveyors known as Flex-Link ® conveyors with chains of a plastic material, but it may otherwise be used for most types of conveyor chains. The invention is, of course, not limited to the embodiment shown but a plurality of variants are possible within the scope of the claims.

What is claimed is:

1. A chain wheel for conveyor installations with chain conveyor belts, and which chain wheel is mounted on the drive shaft (5) of the driving device for the conveyor belt, characterized therein, that it as a basic unit incorporates a pair of hub portions (1, 2) detachably connected against each other, between which, as a separate unit, is clamped a tooth rim (3) comprising at least two sections (3a, 3b).

2. A chain wheel as claimed in claim 1, characterized therein, that the contact surfaces between the hub portions (1, 2) and the tooth rim sections (3a, 3b) are provided with profiles (8) for guiding purposes and also for increasing the frictional resistance.

3. A chain wheel as claimed in claim 1, characterized therein, that the hub portions (1, 2) are mounted on the drive shaft (5) via an reinforcing disc (4) clamped between the hub portions inside the tooth rim (3), whereby the torsional moment from the drive shaft (5) is transferred to the tooth rim (3) via the reinforcing disc (4) and the hub portions (1, 2).

4. A chain wheel as claimed in claim 3, characterized therein, that the clamping force for the hub portions (1, 2) is adjustable for determining a maximum torsional moment that can be transferred from the drive shaft (5) to the tooth rim (3) via the reinforcing disc (4) and the hub portions (1, 2), thus that when exceeding said maximum torsional moment the friction resistance between the hub portions (1, 2) and the tooth rim (3) is lower than the torsional moment from the drive shaft (5).

5. A chain wheel as claimed in claim 3, characterized therein, that the hub portions (1, 2) and the tooth rim (3) are made in plastic material whereas the reinforcing disc (4) is of metallic material, e.g. steel.

6. A chain wheel as claimed in claim 1, characterized therein, that it is designed as a modular system which can be enlarged with several basic units incorporating tooth rims (3) with associated hub portions (1, 2).

* * * * *